May 22, 1945.  E. O. DELLBRINGGE  2,376,478
SUPPORTING DEVICE FOR TRAILERS
Filed Nov. 18, 1943   2 Sheets-Sheet 1

INVENTOR.
E. O. DELLBRINGGE
BY
ATTORNEY

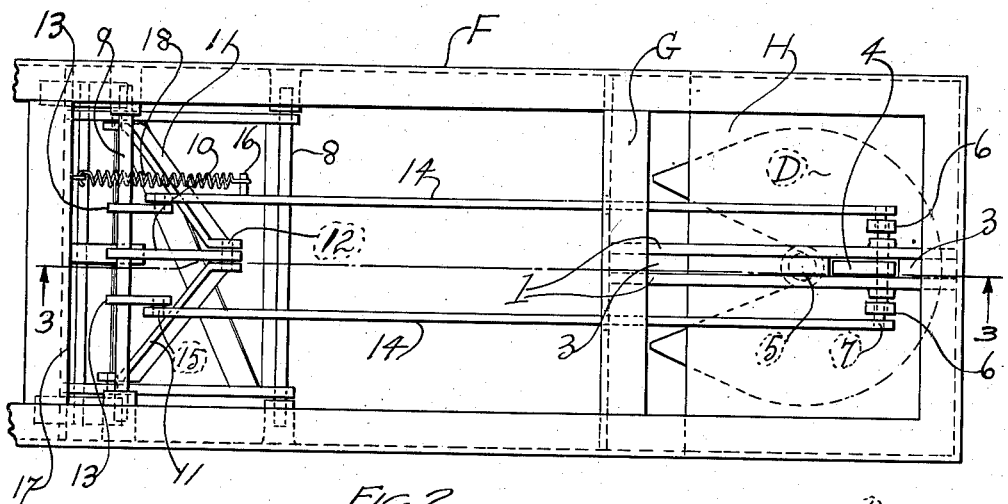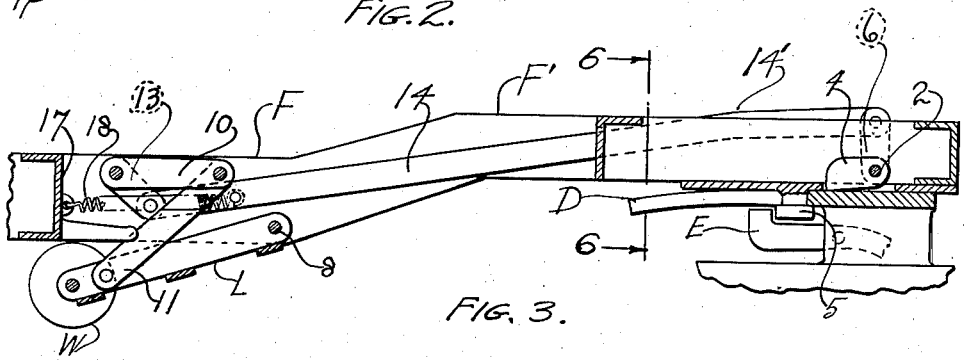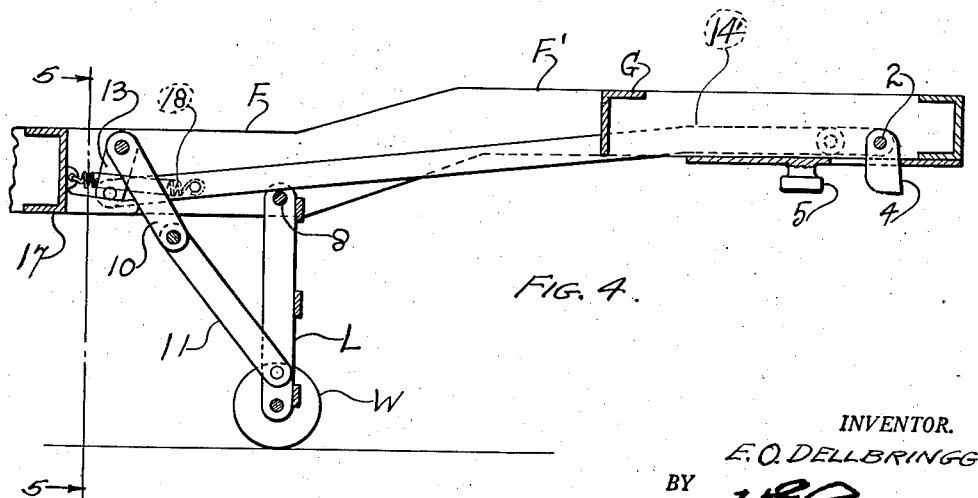

Patented May 22, 1945

2,376,478

UNITED STATES PATENT OFFICE 2,376,478

SUPPORTING DEVICE FOR TRAILERS

Edward O. Dellbringge, St. Louis, Mo., assignor of one-half to Arthur L. Morgan, Sr., St. Louis, Mo.

Application November 18, 1943, Serial No. 510,740

4 Claims. (Cl. 280—33.1)

This invention relates to trailers adapted to be coupled to tractors, and particularly to the mechanism for raising and lowering the forward supporting device of such a trailer during the coupling and uncoupling process.

As is well known by those who are familiar with this type of vehicle, the usual trailer is equipped with rear wheels, and also with a device, usually having a pair of wheels, near its forward end adapted to rest upon the ground and thus support the forward end of said trailer when not coupled to a tractor, which supporting device can be raised to a position where it will not contact the ground when the trailer is in its operative position coupled to a tractor.

Heretofore the raising and lowering of these forward supporting devices has been accomplished by mechanism which was much more complicated than my device. Through the use of my invention the supporting device is raised or lowered automatically during the coupling or uncoupling, which greatly simplifies the operation and permits of a considerable saving of time on the part of the operator, since all he needs to do is to back the tractor up against the trailer to proper position for coupling and fasten the locking device which holds them together, and consequently some saving in operating expense is realized. In addition to this advantage, my invention is of simple construction and therefore does not easily get out of order, and it can be inexpensively produced.

Fig. 2 is a top plan view of my invention taken on line 2—2, Fig. 1.

Fig. 3 is a sectional view taken on line 3—3, Fig. 2, illustrating the supporting device in raised position.

Fig. 4 is a view similar to Fig. 3, but showing said device in lowered position.

Figure 1:
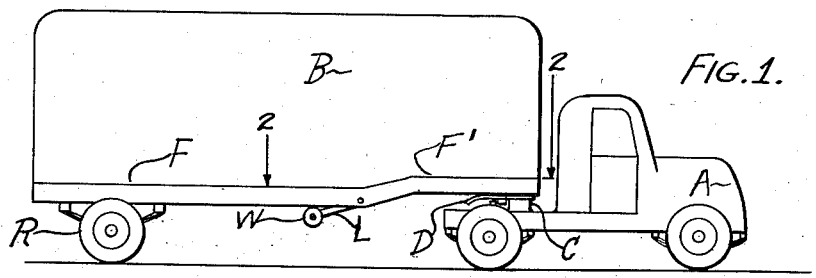
Fig. 1 is a side elevation of a trailer equipped with my invention and coupled to a tractor.

In the drawings A designates a tractor and B a trailer coupled thereto, as illustrated in Fig. 1. The tractor is equipped near its rear end with a pedestal C on which is rigidly mounted a substantially circular plate D, provided with a wedge-shaped cut-out portion and bent downwardly at its rear portion (Figs. 2 and 3). A locking element E is pivotally secured to the pedestal C for the purpose of holding said trailer and tractor in engagement. The parts thus far mentioned are common to most tractors and do not form a part of this invention, and will therefore not be further described.

I will now describe the trailer to be associated with the above described tractor, with particular reference to the parts thereof which constitute my new invention.

The trailer comprises the usual framework F having a slightly higher forward portion F' so that said forward portion may be slid over the rear end of the tractor. At a suitable distance from the front end of said framework portion F' a transverse bar G is rigidly positioned between the side members of the frame, and the rectangular space enclosed within the framework F' and the bar G is provided with a floor H, which terminates a slight distance short of the bar G.

At the forward end of said trailer, which, when associated with the tractor, is positioned above the tractor parts above described, are provided two parallel, longitudinal bars 1 rigidly secured to the floor H and extending from the front end of the framework portion F' to the bar G, said bars 1 being spaced a slight distance apart to form a groove and also acting as guide members. Near the forward ends of said bars 1 registering apertures are provided for the reception of a rod 2, said rod being of such length as to extend through and slightly beyond both of the bars 1, and being rotatable within said apertures. At the front and rear ends of the groove between the bars 1, blocks 3 are rigidly secured to assist in securing said bars in position.

In the groove between the bars 1 and near the front of the trailer an element 4 is rigidly secured to the rotatable rod 2, said element 4 being swingable through an aperture in the floor H between said bars 1, and a portion of said element 4 extending downwardly through said aperture below the floor H. A kingpin 5 is positioned in said groove a slight distance back of the swingable element 4, said kingpin extending above and below the floor H through an aperture in said floor, and being of such diameter as to fit rather snugly between the bars 1. At each end of the rotatable rod 2 an oblong member 6 is rigidly secured thereto, so that the members 6 will swing when said rod 2 is rotated, and each member 6 is provided near its free end with an aperture for the reception of a pin 7 which is rigidly secured within said aperture to the member 6 and extends outwardly therefrom.

The parts described thus far are all located above the rear end of the tractor when the trailer and tractor are in engagement with each other.

I will now proceed to describe those parts of my invention which are located back of the tractor and are in association with the forward supporting device of the trailer which is adapted to be swung to raised or lowered position. For the purposes of this specification I have illustrated the supporting device as being equipped with wheels and I will refer to them as "supporting wheels," since their function mainly is to assist in supporting the front end of the trailer when dissociated from the tractor.

Figure 5:
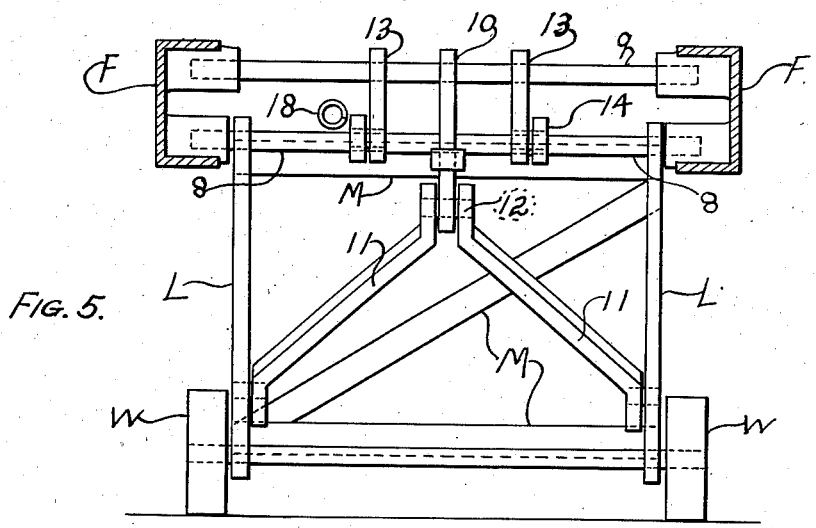
Fig. 5 is an enlarged detail view taken on line 5—5, Fig. 4.
Figure 6:
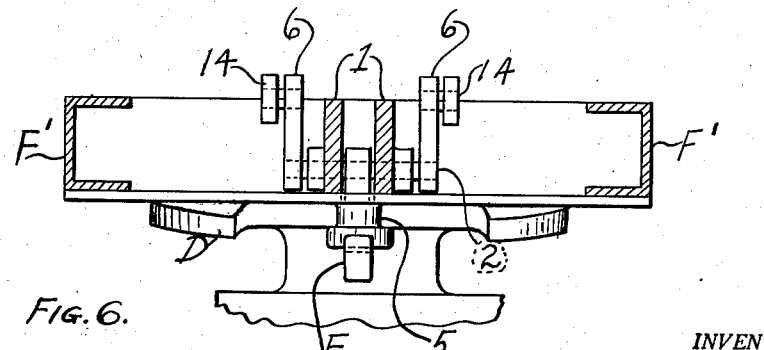
Fig. 6 is an enlarged detail view taken on line 6—6, Fig. 3.

My trailer then is equipped with the usual rear wheels R (Fig. 1) and with forwardly located supporting wheels W, mounted on legs L which are reinforced by bracing bars M. The legs L are swingably mounted on a rod 8 which extends transversely of the framework F and which is rigidly secured in apertures provided therefor in the side members of said framework. At a suitable distance to the rear of the rod 8 another rod 9 is rotatably mounted transversely of the framework F in apertures provided therefor. At the center of the rod 9 an oblong member 10 is rigidly mounted thereon by means of an aperture adjacent one end of said oblong member 10, and at its free end said member 10 is provided with a second aperture. Rods 11 are pivotally secured to the free, apertured end of the oblong member 10, one on each side thereof, each rod 11 being also apertured at one of its ends and being held in pivotal engagement with said oblong member 10 by means of a pin, or bolt and screw arrangement, 12 which extends through the three apertures just mentioned. The rods 11 extend diagonally from the oblong member 10 to a point adjacent the lower ends of the legs L, where they are rigidly secured to said legs (Fig. 5). From what has just been said it will be apparent that when the oblong member 10 is rotated by the pivotal rod 9, this movement will also swing the legs L and the supporting wheels W attached thereto.

Spaced from the oblong member 10 and on either side thereof two similar but somewhat shorter oblong members 13 are rigidly mounted on the pivotal rod 9 by means of apertures at one of their ends, and each member 13 also has an aperture at its free end. The members 13 are so positioned on the rod 9 that each member 13 is exactly opposite one of the members 6. I provide two parallel rods 14, each of which extends from one of the members 6 to the opposite member 13. Each rod 14 is bent downwardly at 14' for purpose to be hereinafter set forth. It will be recalled that each of the members 6 has a pin 7 secured in an aperture at its free end, and one end of each of the rods 14 is apertured and secured to the member 6 by means of a pin 7. The opposite end of each rod 14 is also apertured and secured to the free end of the opposite member 13 by means of a pin 15 through the apertures in the members 13 and rod 14. Slits are provided in the transverse bar G to permit the passage of the rods 14 therethrough. On one of the rods I secure rigidly an oblong member 16 similar to the members 13, the free end of the member 16 having an aperture, and somewhat to the rear of the rod 9 a transverse bar 17 extends from side to side of the framework F and is rigidly secured thereto. A spring 18 is secured at one of its ends in the aperture at the free end of the member 16 and at its opposite end to the transverse bar 17, so that it passes under the rod 9 and lies parallel with the sides of the framework F.

As pointed out at the beginning of this specification, when a tractor and trailer are coupled together for operation, the forward wheels of the trailer on the supporting device are raised to a position where they will not contact the ground, and I will now describe the manner in which my invention accomplishes this operation automatically.

The rear portion of the tractor is backed up under the raised, forward portion F' of the trailer, and during this operation the downwardly curved portion of the plate D forces the forward, raised portion F' still further upwardly. To facilitate this operation, the plate D has been heavily lubricated. This movement is continued until the kingpin 5 is snugly positioned in the angle of the wedge-shaped, cut-out portion of the plate D, where it is frictionally held, and when the parts are in this position the tractor and trailer are locked together by means of the locking element E (Figs. 1 and 2). As the plate D moves backwardly under the floor H it forces the swingable element 4 upward through the aperture provided therefor in said floor from the position shown in Fig. 4 to the position shown in Fig. 3. This movement of the element 4 rotates the rod 2 and consequently swings upward the members 6 rigidly secured thereto, which movement of the members 6 imparts upward and forward movement to the rods 14 which are secured at their forward ends to the members 6, and by virtue of the downward bend 14' the forward portion of raid rods 14 escapes contact with the plate D. By means of the rods 14 this forward motion is transmitted to the oblong members 13 which, being rigidly secured to the rotatable rod 9, impart movement thereto, which in turn transmits the forward and upward motion to the oblong member 10, and consequently upward and backward movement to the diagonal rods 11 pivotally secured to the oblong member 10, thus moving upwardly and backwardly the associated legs L and the supporting wheels W at their lower ends. From the above it will be understood that the supporting wheels W are now drawn up against the framework F in the position shown in Fig. 3, where they will be out of contact with the ground.

When the supporting wheels are to be lowered, it is only necessary to release the locking element E and drive the tractor forward out of engagement with the trailer. This automatically permits the element 4 to fall to the position shown in Fig. 4, and the entire operation just previously described for raising the supporting wheels W is reversed and said wheels again rest upon the ground. While the spring 18 is not essential to the raising operation, the forward movement of the rod 14 to which it is secured does serve to stretch said spring, and when the mechanism is released to lower the wheels to the ground the spring is retracted and this assists in bringing the parts quickly into position for supporting the forward end of the trailer.

I claim:

1. A mechanism for raising and lowering the supporting device of a trailer, comprising a swingable member supported for automatic movement through an aperture in the floor of said trailer by the operation of coupling or uncoupling said trailer and a tractor, a plurality of elements rigidly connected with said swingable element for movement therewith, a plurality of motion-transmitting elements connected to said first-mentioned plurality of elements, and a transverse rotatable rod having rigidly secured thereto a plurality of arms for transmitting movement from said motion-transmitting elements to said transverse rotatable rod and said rotatable rod also being provided with an elongated member which is pivotally secured at its free end to a plurality of converging members for transmitting motion from said rotatable rod to said converging members which are secured at their lower ends to the lower portion of the supporting device, so that motion is transmitted therethrough to said supporting device, the entire mechanism being adapted for operation without manual assistance.

2. A mechanism for raising and lowering the supporting device of a trailer, comprising guide members and a swingable member supported for automatic movement between said guide members through an aperture in the floor of said trailer by the operation of coupling or uncoupling said trailer and a tractor, a stop member positioned within an aperture slightly to the rear of the first-mentioned aperture, a plurality of elements rigidly connected at one of their ends to said swingable element for movement therewith, a plurality of rearwardly extending, elongated, motion-transmitting members each secured at one end to the free end of one of the first-mentioned elements, a transverse rotatable rod provided with means secured to the free ends of said motion-transmitting members for transmitting movement through said motion-transmitting members from said swingable element, and an elongated member rigidly secured to one end of said rotatable rod and pivotally secured at its free end to a pair of converging members for the purpose of transmitting movement from said rotatable rod to said converging members, said converging members being secured at their ends which are farthest apart to the lower portion of the supporting device so that said motion is finally transmitted to said supporting device, the entire mechanism being adapted for operation without manual assistance.

3. A mechanism for raising and lowering the supporting device of a trailer, comprising guide members and a swingable member supported for movement between said guide members through an aperture in the floor of said trailer, the lower portion of said swingable member depending below said floor and being adapted to be forced upwardly during the operation of coupling said trailer to a tractor until the lower edge of said swingable element is flush with the underside of said floor, a stop member adapted to retain said swingable member in raised position through frictional engagement of said stop member and a portion of the associated tractor, a pair of elements each rigidly connected at one of its ends to said swingable element for motion therewith, a pair of longitudinally extending rods each connected at one of its ends to the free end of one of said first-mentioned pair of elements for transmitting said motion, a rearwardly situated, transverse, rotatable rod provided with a pair of arms for transmitting said motion from said longitudinally extending rods to said transverse, rotatable rod, and an elongated member rigidly secured at one of its ends to the approximate center of said transverse, rotatable rod for transmitting said motion to a pair of converging, upwardly extending members which are pivotally secured at their upper ends to the free end of said elongated member and rigidly secured at their lower, farthest apart ends to the lower portion of said supporting device, so that the initial movement of the swingable member is transmitted to said supporting device for raising the same during the coupling operation or lowering the same during uncoupling operation, the entire mechanism being adapted for operation without manual assistance.

4. A mechanism for raising and lowering the supporting device of a trailer, comprising guide members and a swingable member supported for movement between said guide members through an aperture in the floor of said trailer, the lower portion of said swingable member depending below said floor and being adapted to be forced upwardly during the operation of coupling said trailer to a tractor until the lower edge of said swingable element is flush with the underside of said floor, a stop member adapted to retain said swingable member in raised position through frictional engagement of said stop member and a portion of the associated tractor, a pair of elements each rigidly connected at one of its ends to said swingable element for motion therewith, a pair of longitudinally extending rods each connected at one of its ends to the free end of one of said first-mentioned pair of elements for transmitting said motion, a rearwardly situated, transverse, rotatable rod provided with a pair of arms for transmitting said motion from said longitudinally extending rods to said transverse, rotatable rod, an elongated member rigidly secured at one of its ends to the approximate center of said transverse, rotatable rod for transmitting said motion to a pair of converging, upwardly extending members which are pivotally secured at their upper ends to the free end of said elongated member and rigidly secured at their lower, farthest apart ends to the lower portion of said supporting device, so that the initial movement of the swingable member is transmitted to said supporting device for raising the same during the coupling operation or lowering the same during uncoupling operation, and a spring attached at one of its ends to a portion of the framework of said trailer and at its opposite end to one of said longitudinally extending rods so that said spring will be extended during the coupling operation and consequently retracted to expedite lowering of the supporting device during the uncoupling operation, the entire mechanism being adapted for operation without manual assistance.

EDWARD O. DELLBRINGGE.